United States Patent
Zhao et al.

(10) Patent No.: US 7,545,767 B2
(45) Date of Patent: Jun. 9, 2009

(54) APPARATUS AND METHOD OF CONTROLLING UNSOLICITED TRAFFIC DESTINED TO A WIRELESS COMMUNICATION DEVICE

(75) Inventors: Wen Zhao, Kanata (CA); Thomas Leonard Trevor Plestio, Ottawa (CA); Craig Dunk, Guelph (CA); Muhammad Khaledul Islam, Ottawa (CA); Luis Pablo Estable, Gatineau (CA); William Daniel Willey, San Francisco, CA (US)

(73) Assignee: Research In Motion Limited, Waterloo, Ontario (CA)

( * ) Notice: Subject to any disclaimer, the term of this patent is extended or adjusted under 35 U.S.C. 154(b) by 793 days.

(21) Appl. No.: 10/996,664

(22) Filed: Nov. 24, 2004

(65) Prior Publication Data

US 2005/0122930 A1    Jun. 9, 2005

Related U.S. Application Data

(60) Provisional application No. 60/527,335, filed on Dec. 5, 2003.

(51) Int. Cl.
*H04Q 7/24* (2006.01)
(52) U.S. Cl. ........................... 370/328; 455/466
(58) Field of Classification Search ................ None
See application file for complete search history.

(56) References Cited

U.S. PATENT DOCUMENTS

| | | | | |
|---|---|---|---|---|
| 6,052,709 | A * | 4/2000 | Paul | 709/202 |
| 7,155,608 | B1 * | 12/2006 | Malik et al. | 713/170 |
| 2002/0166068 | A1 | 11/2002 | Kilgore | |
| 2003/0061508 | A1 | 3/2003 | Bhat | |
| 2003/0083078 | A1 | 5/2003 | Allison et al. | |

FOREIGN PATENT DOCUMENTS

DE    101 14 649 A1    10/2002

(Continued)

OTHER PUBLICATIONS

"Radius Extension Guide," Netscape Directory Server, Version 4.11, Sun Microsystems, Inc. (1999).

*Primary Examiner*—Erika A Gary
(74) *Attorney, Agent, or Firm*—David C. Jenkins; Brij K. Agarwal; Eckert Seamans Cherin & Mellott, LLC

(57) ABSTRACT

An apparatus and method of controlling unsolicited traffic are disclosed herein. The apparatus and method can be applied to wireless communication networks such as CDMA2000, UMTS, GPRS and the like so that traffic which is not solicited by wireless communication devices operating on those networks is not sent over the air needlessly. The present application provides techniques to block unsolicited traffic based on the identity of a user (for example based on International Mobile Station Identity (IMSI), Network Access Identifier (NAI), Mobile Station Internet Services Digital Network Number (MSISDN), Session Initiation Protocol (SIP) Universal Resource Locator (url)) as opposed to techniques that are based on a session or IP address, such as a traditional firewall. In accordance with this application, user identity based techniques are applied to block unsolicited traffic whenever a user has established a data session. Further in accordance with this application, user identity based techniques are persisted across changes in IP address and/or session.

34 Claims, 16 Drawing Sheets

FOREIGN PATENT DOCUMENTS

| | | |
|---|---|---|
| EP | 1122928 A2 | 8/2001 |
| EP | 1122932 A2 | 8/2001 |
| WO | 99/27726 A1 | 6/1999 |
| WO | WO 00/49776 A1 | 8/2000 |
| WO | WO 01/74041 A2 | 10/2001 |
| WO | WO 02/005514 A1 | 7/2002 |
| WO | 03/007544 A2 | 1/2003 |

* cited by examiner

APPARATUS AND METHOD OF CONTROLLING UNSOLICITED TRAFFIC DESTINED TO A WIRELESS COMMUNICATION DEVICE

CROSS-REFERENCE TO RELATED APPLICATIONS

This application claims the benefit of U.S. Provisional Application No. 60/527,335 filed Dec. 5, 2003.

BACKGROUND

1. Technical Field

This application relates to wireless communication techniques in general, and to an apparatus and method of controlling unsolicited traffic destined to a wireless communication device in particular.

2. Related Art

Some wireless communication devices are known to receive unsolicited traffic. For example, a Code Division Multiple Access (CDMA) 2000 wireless communication device operating in simple Internet Protocol (IP) configuration can receive unsolicited IP packets. Although other non-wireless devices are known to receive unsolicited traffic, techniques traditionally used with non-wireless devices may be inappropriate as there is a significant waste of resources, both in the wireless network, as well as in a wireless communication device, whenever unsolicited traffic gets sent over the air interfaces.

One technique that is known, which partly addresses this problem, involves using a private addressing scheme. However, even if a private addressing scheme is used, this technique may not prevent unsolicited traffic initiated from within the private address space from reaching the wireless communication device. Furthermore, this technique may be unacceptable if a public address is desired, as is the case for example with certain CDMA2000 wireless carriers. Another technique that is known, which partly addresses this problem, involves using a firewall within the wireless communication network. However, firewall rules may have to be manually configured, and may be ineffective if the rules depend on the wireless communication devices addresses, which may be subject to change due to mobility. For example, in the case of CDMA2000, IP address can be dynamically assigned and reused, which may render the firewall rules ineffective for the wireless communication device.

Generally speaking there are three categories of unsolicited traffic which require screening: (a) Stale Session Unsolicited Traffic—When a mobile device stops using an IP address A without first terminating communications previously established to other servers, packets may continue to be sent to the same IP address A. Examples are Virtual Private Network (VPN) packets, Peer-to-Peer (P2P) file sharing, spyware and many more. Such packets often are sent continuously to the device. Unsolicited traffic can arrive via a stale IP session when a second mobile device acquires IP address A, and starts receiving packets from stale IP session(s), the unsolicited traffic originally intended to reach the first mobile device; and (b) Inter-subscriber Intra-subnet Unsolicited Packets—Subnet constrained broadcasts or serial unicast from one mobile to another are effectively unsolicited packets received from other subscriber served by the same operator (e.g. worms exploiting subnet discovery protocols such as Internet Control and Management Protocol (ICMP) or Simple Service Discovery Protocol (SSDP); and (c) malicious packets.

A mobile device may not be able to block a network from sending packets, since a connection to the network or a call must be established and IP data examined prior to a packet's validity being determined. Packets from Stale IP sessions can be considered unsolicited packets. There are network and mobile device impacts which arise from unsolicited packets. First, the network impact is such that unsolicited traffic means inefficient use of network resources (sending undesired data to users), resulting in data delivery delays for other users as well as the possibility of complete network unavailability for voice or data service for many users within a geographic area. Second, the device impact is such that unsolicited traffic means a mobile device may be paged to set up calls on an ongoing basis, resulting in very rapid battery drain as well as erroneous accounting of data usage records for a particular data capable mobile device. Thirdly, receiving undesired unsolicited traffic can be irritating to customers.

BRIEF SUMMARY OF THE INVENTION

In order to overcome the negative impacts highlighted above, the present application provides an apparatus and method of controlling unsolicited traffic which can be applied to wireless communication networks such as CDMA2000, Universal Mobile Telecommunications System (UMTS), General Packet Radio Service (GPRS) and the like so that traffic which is not solicited by wireless communication devices operating on those networks is not sent over the air needlessly. The present application provides techniques to block unsolicited traffic based on the identity of a user (for example based on International Mobile Station Identity (IMSI), Network Access Identifier (NAI), Mobile Station Internet Services Digital Network Number (MSISDN), Session Initiation Protocol (SIP) Universal Resource Locator (url)) as opposed to techniques that are based on a session or IP address, such as a traditional firewall. In accordance to this application, user identity based techniques are applied to block unsolicited traffic whenever a user has established a data session. Further in accordance with this application, user identity based techniques are persisted across changes in IP address and/or session.

According to a first aspect of the present application, there is provided in a wireless communication network, the wireless communications network comprising an unsolicited traffic controller (UTC) coupled to a packet data network and a plurality of wireless communication devices, a method of controlling traffic destined to a first one of the plurality of wireless communication devices comprising the steps of: storing a set of traffic control rules associated with the first one of the plurality of wireless communication devices; determining a first identify corresponding to a user of the first one of the plurality of wireless communication devices; determining that a first packet received from the packet data network is destined to the first one of the plurality of wireless communication devices; selecting the stored traffic control rules associated with the determined first identify; applying the selected traffic control rules to determine if the first packet is unsolicited by said user; and preventing the first packet from being sent to the first one of the plurality of communication devices if the first packet is determined to be unsolicited.

According to a second aspect of the present application there is provided a computer readable medium having stored thereon, computer executable instructions which when executed by a processor in an unsolicited traffic controller (UTC), cause the UTC to: store a set of traffic control rules associated with a specified one of a plurality of wireless communication devices; determine an identify corresponding to a user of the specified one of the plurality of wireless communication devices; determine that a first packet received from a packet data network is destined to the specified one of the plurality of wireless communication devices; select the stored set of traffic control rules associated with the determined identity; apply the selected traffic control rules to determine if the first packet is unsolicited by the user; and prevent the first packet from being sent to said specified one of the plurality of communication devices if the first packet is determined to be unsolicited, wherein the UTC is resident in a wireless communications network and coupled to said packet data network and said plurality of wireless communication devices.

According to a third aspect of the present application there is provided a carrier wave embodying a computer data signal representing sequences of instructions which, when executed by a processor, cause the processor to: store a set of traffic control rules associated with a specified one of a plurality of wireless communication devices; determine an identify corresponding to a user of the specified one of the plurality of wireless communication devices; determine that a first packet received from a packet data network is destined to the specified one of the plurality of wireless communication devices; select the stored set of traffic control rules associated with the determined identify; apply the selected traffic control rules to determine if the first packet is unsolicited by the user; and prevent the first packet from being sent to the specified one of the plurality of communication devices if the first packet is determined to be unsolicited, wherein the processor is an unsolicited traffic controller (UTC), and wherein the UTC is resident in a wireless communications network and coupled to said packet data network and said plurality of wireless communication devices.

According to a fourth aspect of the application, there is provided in a wireless communication network, an apparatus for controlling unsolicited traffic destined to a specified one of a plurality wireless communication devices, the apparatus comprising: a first interface configured to receive traffic from a packet data network; a second interface configured to send traffic to the specified one of the plurality of wireless communication devices; a first storage medium having stored thereon computer executable instructions representing a set of traffic control rules; and an unsolicited traffic controller (UTC) communicating with the first and second interfaces and the first storage medium, wherein the UTC determines an identity assigned to said specified one of said plurality of wireless communication devices, and executes the computer executable instructions to selectively block said unsolicited traffic received over the first interface from being sent over the second interface to the specified one of the plurality wireless communication devices.

Other aspects and features of the present application will be apparent to those ordinarily skilled in the art upon review of the following description of the specific embodiments of an apparatus and method of controlling unsolicited traffic destined to a wireless communication device.

BRIEF DESCRIPTION OF THE DRAWINGS

Embodiments of the present application will now be described, by way of example only, with reference to the attached figures, wherein.

Same reference numerals are used in different figures to denote similar elements.

DETAILED DESCRIPTION

Figure 1:
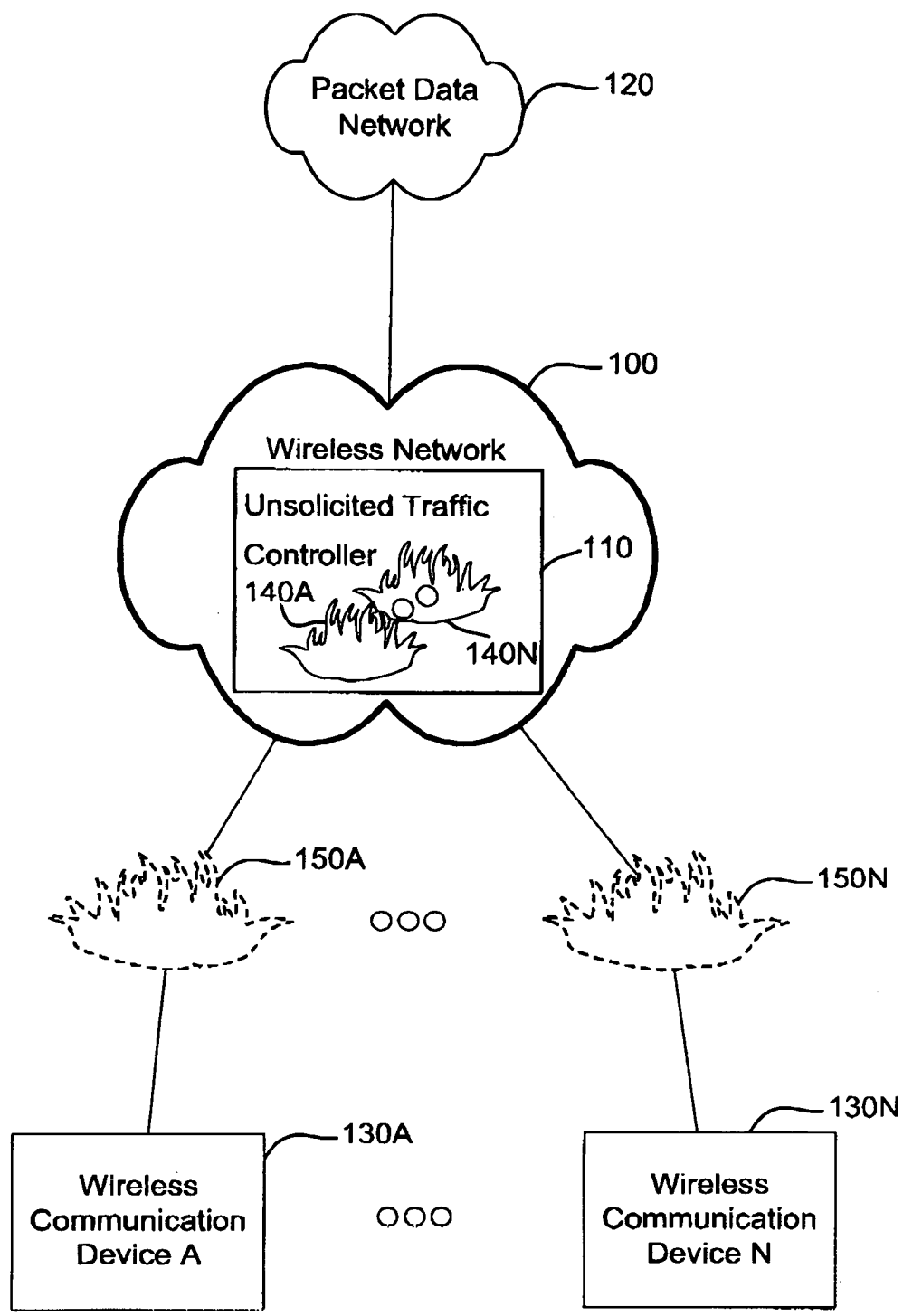
FIG. 1 is a block diagram illustrating a wireless network including an embodiment of the unsolicited traffic controller (UTC), provided in accordance with the present application.

Referring now to the drawings, FIG. 1 is a block diagram illustrating a wireless network including an embodiment of an unsolicited traffic controller (UTC), provided in accordance with the present application. The block diagram shows a wireless network 100 coupling a packet data network 120 with wireless communication devices 130A . . . 130N, and coupling wireless communication devices to one another, thereby enabling traffic to flow to and from packet data network 120 from and to wireless communication devices 130A . . . 130N, and enabling traffic to flow to and from one wireless communication device 130A to and from another wireless communication device 130N.

Wireless network 100 includes an unsolicited traffic controller 110, provided in accordance with the present application, the purpose of which is to affect the manner that the coupling between wireless communication devices 130A . . . 130N to each other and to packet data network 120 occurs, so as to limit unsolicited traffic destined to wireless communication devices 130A . . . 130N. Specifically, unsolicited traffic controller 110 includes a set of firewall-like rules 140A . . . 140N, each of which corresponds to a specific wireless communication device 130A . . . 130N, so that their combined effect is that the over the air interfaces behave as if they were each substantially firewalled 150A . . . 150N.

Various embodiments of an unsolicited traffic controller are envisaged, each adapted to the particular requirements of a specific wireless network. For example, in an embodiment adapted to a CDMA wireless network, the unsolicited traffic controller is preferably located in at least one Packet Data Serving Node (PDSN) of the wireless network. Alternatively, in an embodiment adapted to a GPRS wireless network, the unsolicited traffic controller is preferably located in at least one Serving GPRS Support Node (SGSN), further preferably in at least one Gateway GPRS Support Node (GGSN). The choice of where to locate the unsolicited traffic controller is guided by the principle that it should have access to all traffic destined to the wireless devices so as to control the flow of unsolicited traffic. In this regard, an unsolicited traffic controller can be adapted to operate with any given wireless network in view of the present application.

The unsolicited traffic controller 110 of FIG. 1 can be configured for co-operation with GPRS. GPRS is specified for example by 3GPP. A push initiator is located within packet data network 120. Wireless communication devices 130A thru 130N are user equipment, and each includes at least one user agent, and a push recipient. Wireless network 100 is a public land mobile network, and includes a push function as well as push subscription profiles corresponding to each of the users of the user equipments. The unsolicited traffic controller 110 in this embodiment operates as a user based firewall by controlling unsolicited traffic based on the push subscription profiles of the users of the user equipment: depending on configuration, it is envisaged that the unsolicited traffic controller 110 controls traffic based on IMSI, NAI, MSISDN or SIP url, for example.

The remainder of this description and drawings will use IP packets and IP addresses for exemplary purposes only, as the techniques shown herein can be applied to many alternative forms of communication. For example, the technique could be applied to voice, e-mail, hyper text transfer protocol (http), file transfer protocol (ftp), multimedia messaging service (MMS) and short messaging service (SMS).

FIGS. 2 to 8 define various techniques for unsolicited traffic control. As those skilled in the art will appreciate, traffic can be controlled by implicit, explicit or dynamic rules or a combination of such rules. With respect to the physical structure of an unsolicited traffic controller, FIG. 16, which will be discussed later, describes an exemplary embodiment. Most notably, the unsolicited traffic controller stores the rules (see element 1670 in FIG. 16) which are used to selectively block packets.

Figure 2:
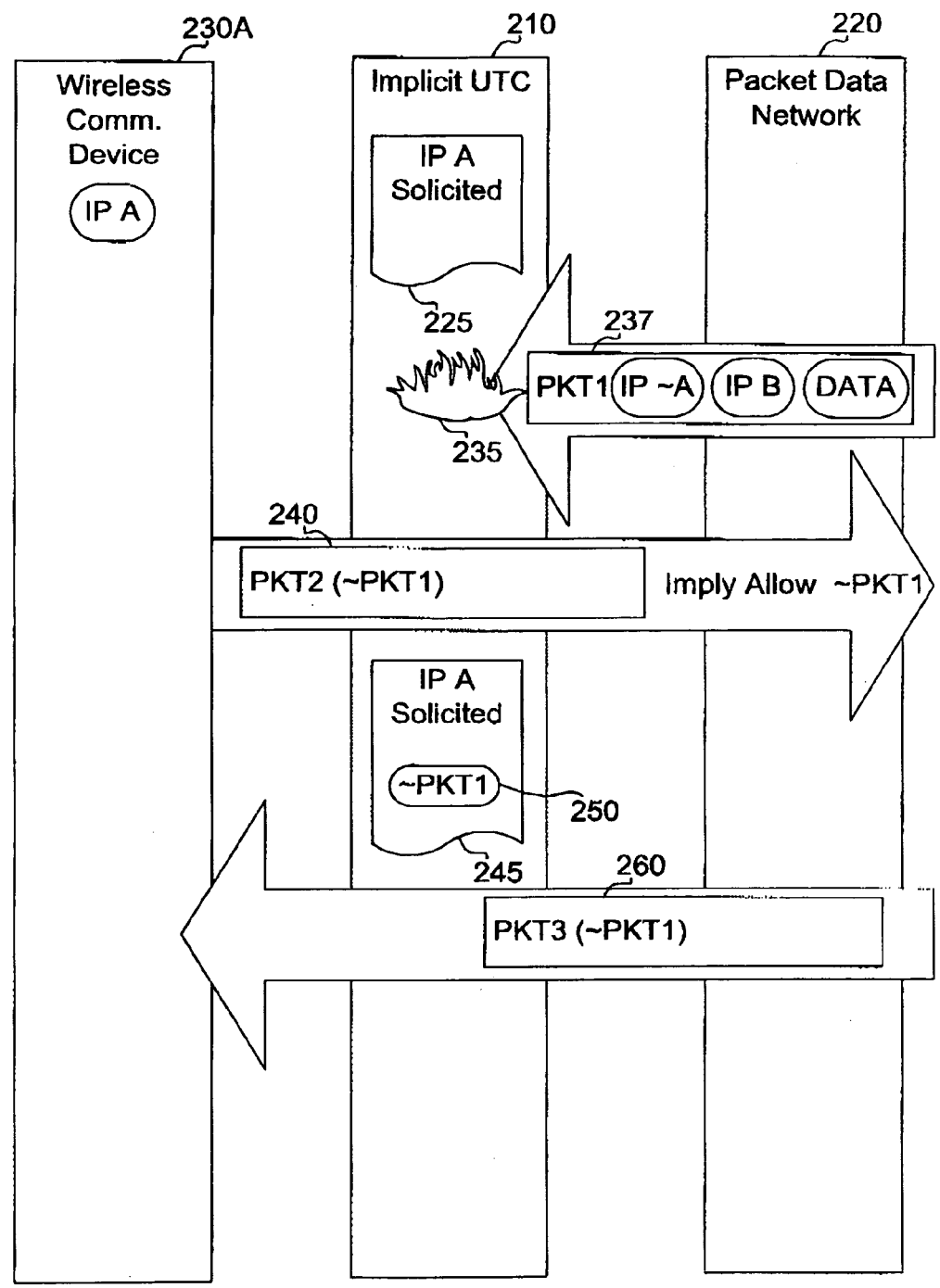
FIG. 2 is an interaction diagram illustrating the technique of implicit unsolicited traffic control, provided in accordance with the present application.

Turning now to FIG. 2, an interaction diagram illustrating the technique of implicit unsolicited traffic control, provided in accordance with the present application is depicted. The interaction diagram shows the interactions between a wireless communication device 230A, an implicit unsolicited traffic controller 210, and a packet data network 220.

Before describing this first interaction diagram further, it is important to describe some common aspects of notation that are used in this and other interaction diagrams of the present application. Time flows generally downwards in this interaction diagram, as well as in the other interaction diagrams of the present application. Furthermore, the tilde (~), as used in the drawings, in this description, is meant to be shorthand for "substantially like". Thus IP ~A is meant to denote all addresses which are substantially like IP A for some specific purpose. For example, the notation IP ~A when used to qualify IP addresses which can reach a wireless device having IP A, this includes IP A itself, as well as broadcast addresses, any cast addresses and multicast addresses which would normally reach IP A in the absence of the techniques of the present application. The same tilde (~) notation is used to denote packets. For example, if PKT1 has destination address IP A, source address IP B, and data, then ~PKT1 is meant to denote packets which are substantially like PKT1 for some specific purpose, e.g. where a substantial similarity can be found between the source, destination, and/or data between the two packets. For instance, in TCP/IP and UDP/IP packets, data in one packet can be considered to be substantially like data in another packet if port numbers or socket numbers are substantially similar. As another example, for ICMP/IP packets, data can include protocol numbers.

Operationally, wireless communication device 230A is currently assigned address IP A. Implicit UTC 210 keeps track of what kind of traffic is considered solicited for IP A. This is shown at two times in the IP A Solicited blocks. Initially, IP A Solicited 225 does not contain any information with respect to the packets illustrated in FIG. 2. Consequently, when PKT1 237 is destined to an address like IP A, i.e. IP ~A, implicit UTC 210 advantageously blocks 235 PKT1 237. Further advantageously, implicit UTC 210 recognizes that wireless communication device 230A sent out PKT2 (~PKT1) 240, and consequently updates the list IP A Solicited 245 to include ~PKT1 250, so that when PKT3 (~PKT1) 260 is destined to wireless communication device 230A, it is not blocked.

Figure 3:
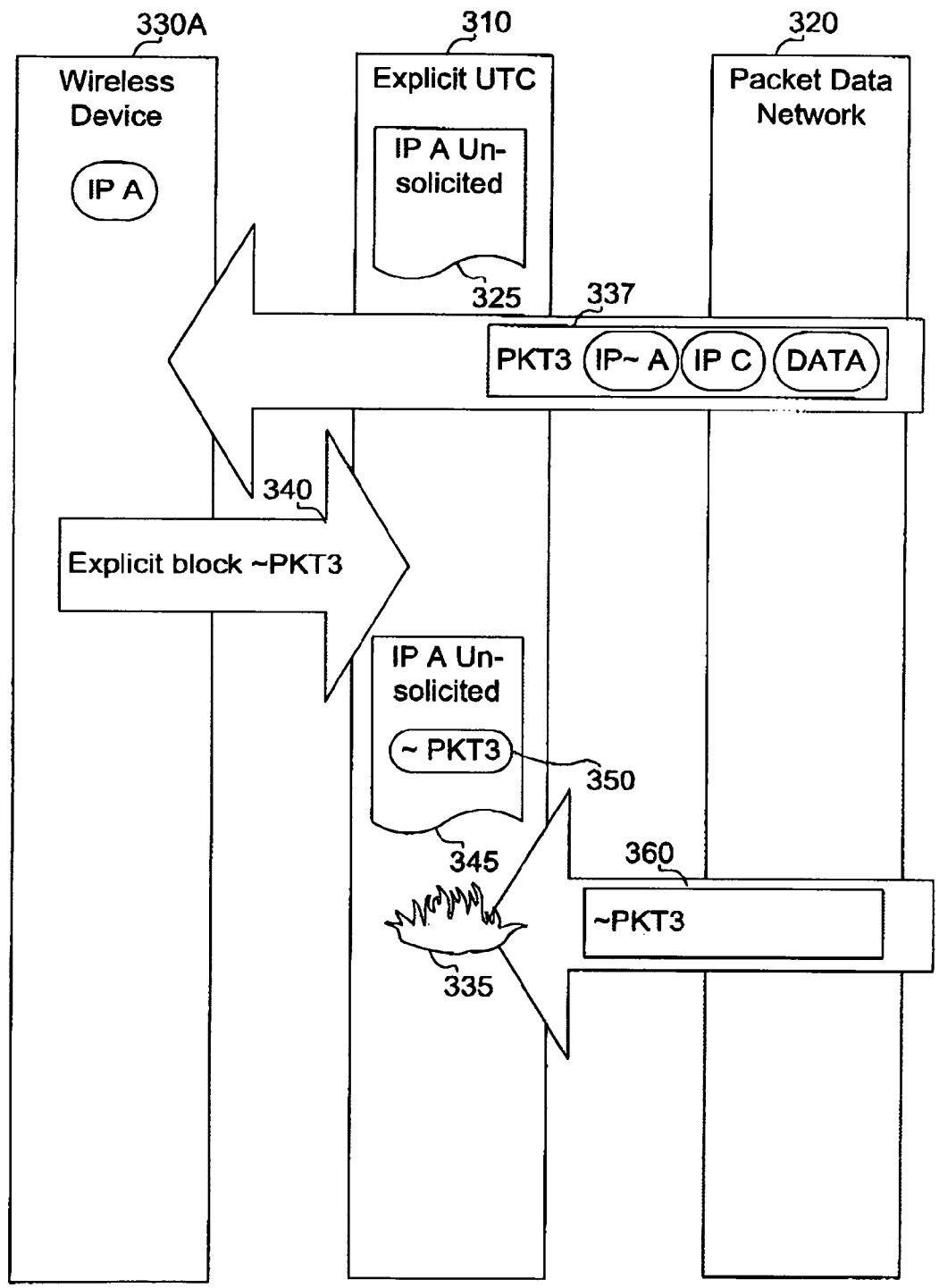
FIG. 3 is an interaction diagram illustrating the technique of explicit unsolicited traffic control, provided in accordance with the present application.

FIG. 3 is an interaction diagram illustrating the technique of explicit unsolicited traffic control, provided in accordance with the present application. Turning now to FIG. 3. similarly to FIG. 2, wireless communication device 330A is currently assigned address IP A. Explicit UTC 310 keeps track of what kind of traffic is considered unsolicited for wireless communication device 330A. This is shown at an initial time prior to explicit block 340, in the list IP A unsolicited block 325 and at a time subsequent to explicit block 340, in the list IP A unsolicited block 345. Initially, the list IP A Unsolicited 325 does not contain any information with respect to the packets illustrated in FIG. 3, and in particular PKT3 337. Consequently, when PKT3 337 is destined to an address like IP A, i.e. ~IP A, Explicit UTC 310 advantageously allows PKT3 337 to go through. After wireless communication device 230A receives PKT3 337, it sends an Explicit Block ~PKT3 message 340 to Explicit UTC 310. Consequently, explicit UTC 310 updates the list IP A Unsolicited 345 so as to include ~PKT3 350, so that when a packet like PKT3, i.e. ~PKT3 360, is destined to wireless communication device 330A, it is blocked 335.

In an alternate embodiment, wireless communication device 330A may also send an explicit unblock ~PKT3 message to Explicit UTC 310 at a later time so that Explicit UTC 310 updates IP A unsolicited 345 to exclude ~PKT3 350. At any time subsequent to the unblock ~PKT3, if a packet like PKT3, i.e. ~PKT3, is destined to wireless communication device 330A, it would be let through.

In yet another embodiment, the explicit UTC aspect of FIG. 3 can be combined with the implicit UTC aspect of FIG. 2. If wireless communication device 330A sends a packet ~PKT3 to the Packet Data Network 320, even though explicit UTC 310 accepts explicit blocks and unblocks, it can also interpret ~PKT3 as an implicit unblock and consequently updates the IP A Unsolicited 345 to remove ~PKT3 350, so that when an other packet ~PKT3 is destined to wireless communication device 330A, it is no longer blocked.

Figure 4:
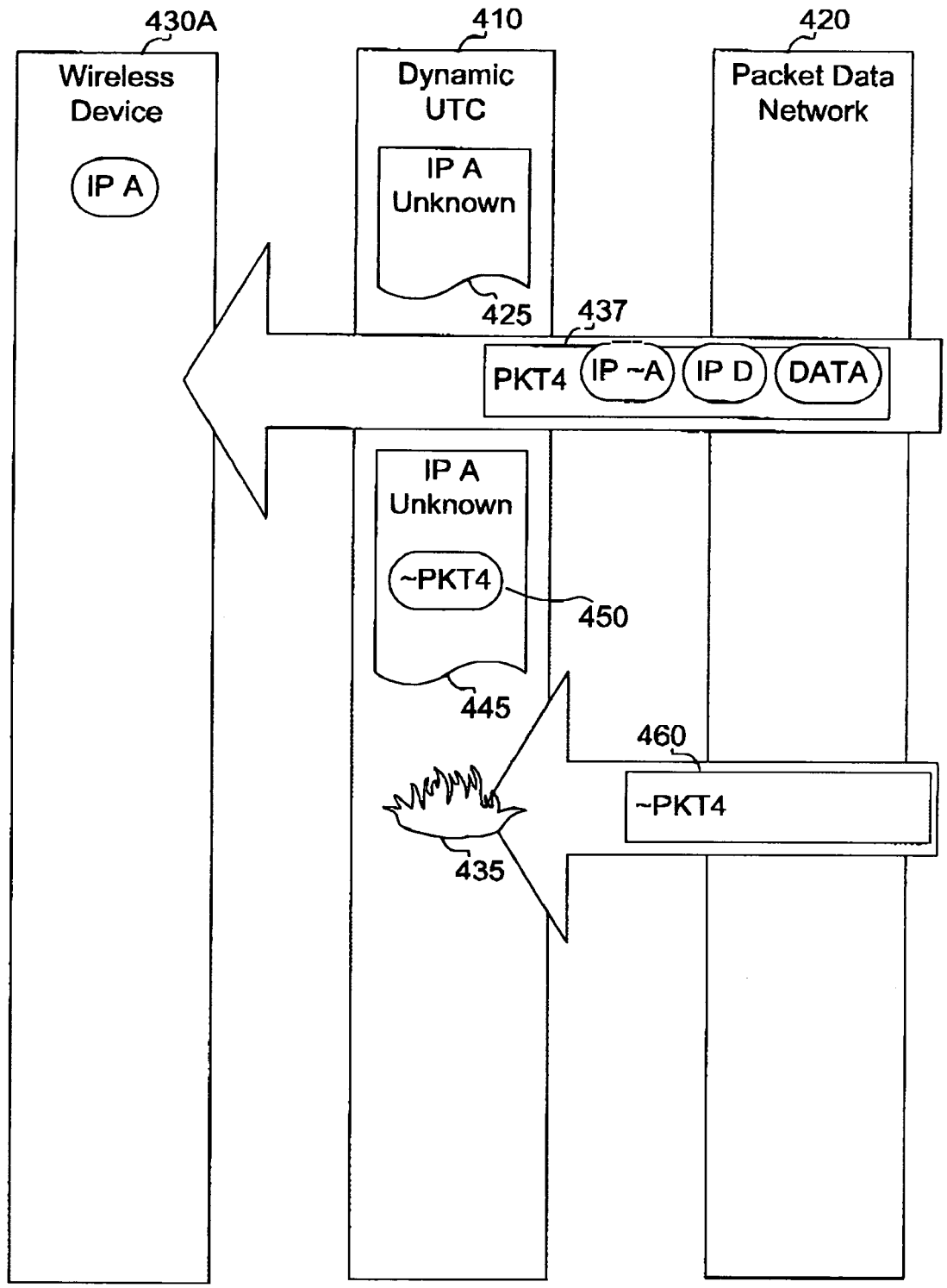
FIG. 4 is an interaction diagram illustrating the technique of dynamic unsolicited traffic control, provided in accordance with the present application.

FIG. 4 is an interaction diagram illustrating the technique of dynamic unsolicited traffic control, provided in accordance with the present application. Turning now to FIG. 4, similarly to FIGS. 2-3, wireless communication device 430A is currently assigned IP A. Dynamic UTC 410 keeps track of what kind of traffic is considered unknown for A. This is shown at two times in the A unsolicited blocks. Initially, the list IP A Unknown 425 does not contain any information with respect to the packets illustrated in FIG. 4, and in particular PKT4 437. Consequently, when PKT4 437 is destined to an address like IP A, i.e. IP~A, Dynamic UTC 410 advantageously allows PKT4 437 to go through once after which Dynamic UTC 410 updates A Unknown 445 to include ~PKT4, so that when a subsequent packet like PKT4, i.e. ~PKT4 460 is destined to wireless communication device 430A, it is blocked 435. In an alternative embodiment, it is envisaged that the blocking operation allow for a predetermined number of packets matching a listing in IP A unknown before blocking subsequent packets.

In other alternative embodiments, wireless communication device 430A can also send either an explicit or implicitly unblock to Dynamic UTC 410 at a later time so that Dynamic UTC 410 updates list IP A Unknown 445 to allow packets like PKT3, i.e. ~PKT4 450. Thus, when a packet like PKT, i.e. ~PKT4, is destined to wireless communication device 230A, it is not blocked.

Figure 5:
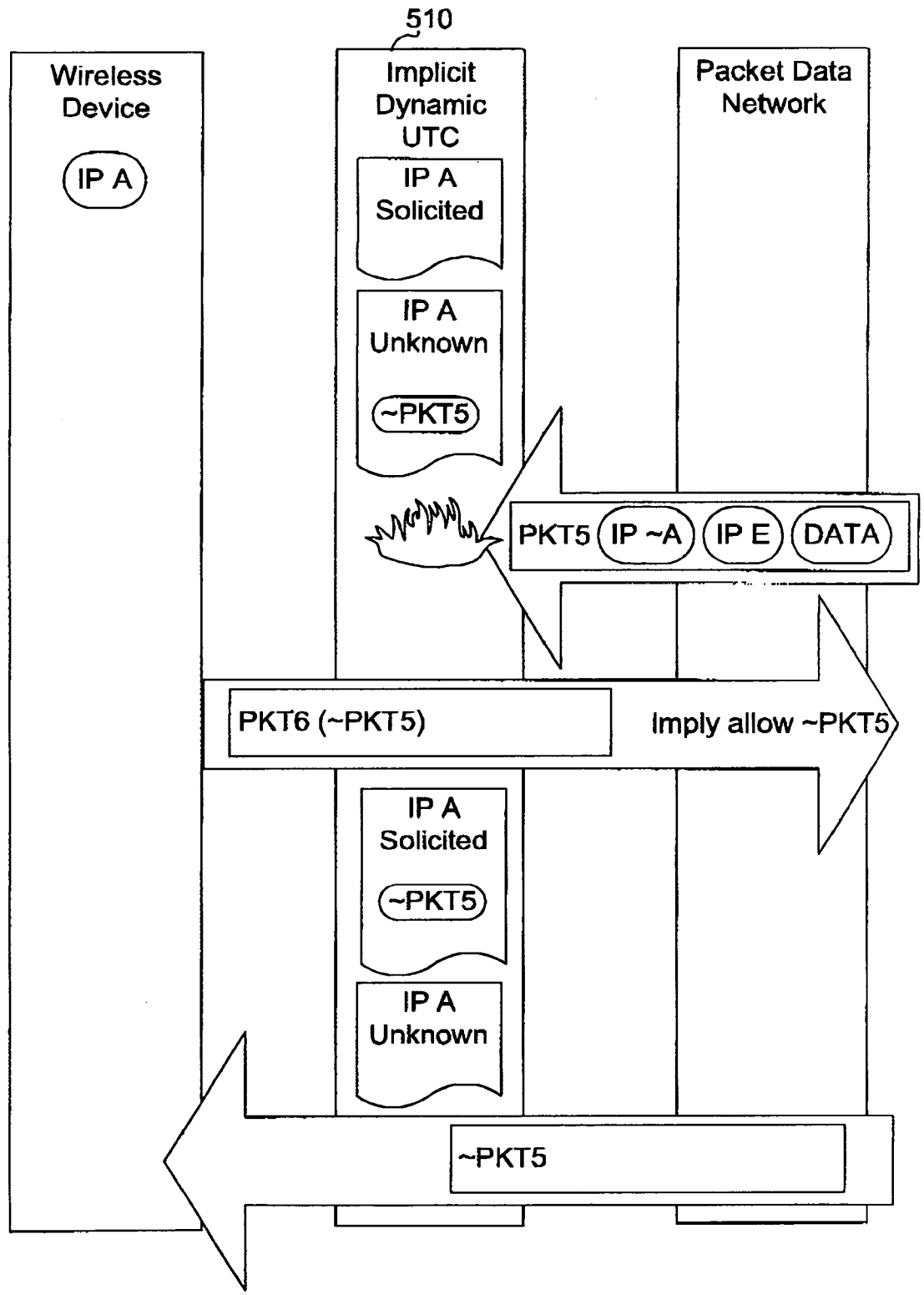
FIGS. 5-8 are interaction diagrams illustrating the combination of the techniques shown in FIGS. 2-4.

FIG. 5 shows an embodiment of an UTC 510 that combines the implicit aspect of the UTC 210 of FIG. 2 with the dynamic aspect of the UTC 410 of FIG. 4.

Figure 6:
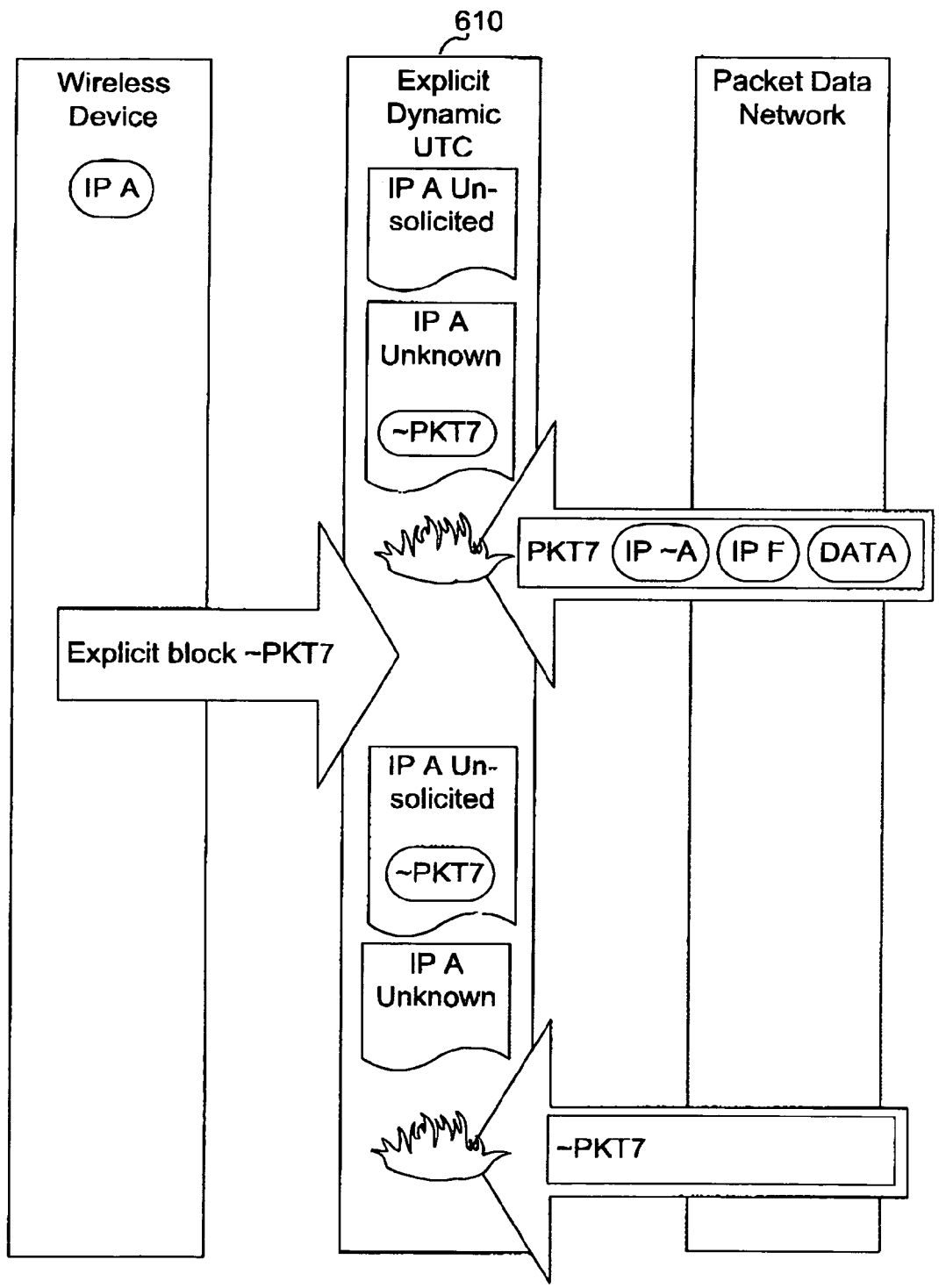

FIG. 6 shows an embodiment of an UTC 610 that combines the explicit aspect of UTC 310 of FIG. 3 with the dynamic aspect of the UTC 410 of FIG. 4.

Figure 7:
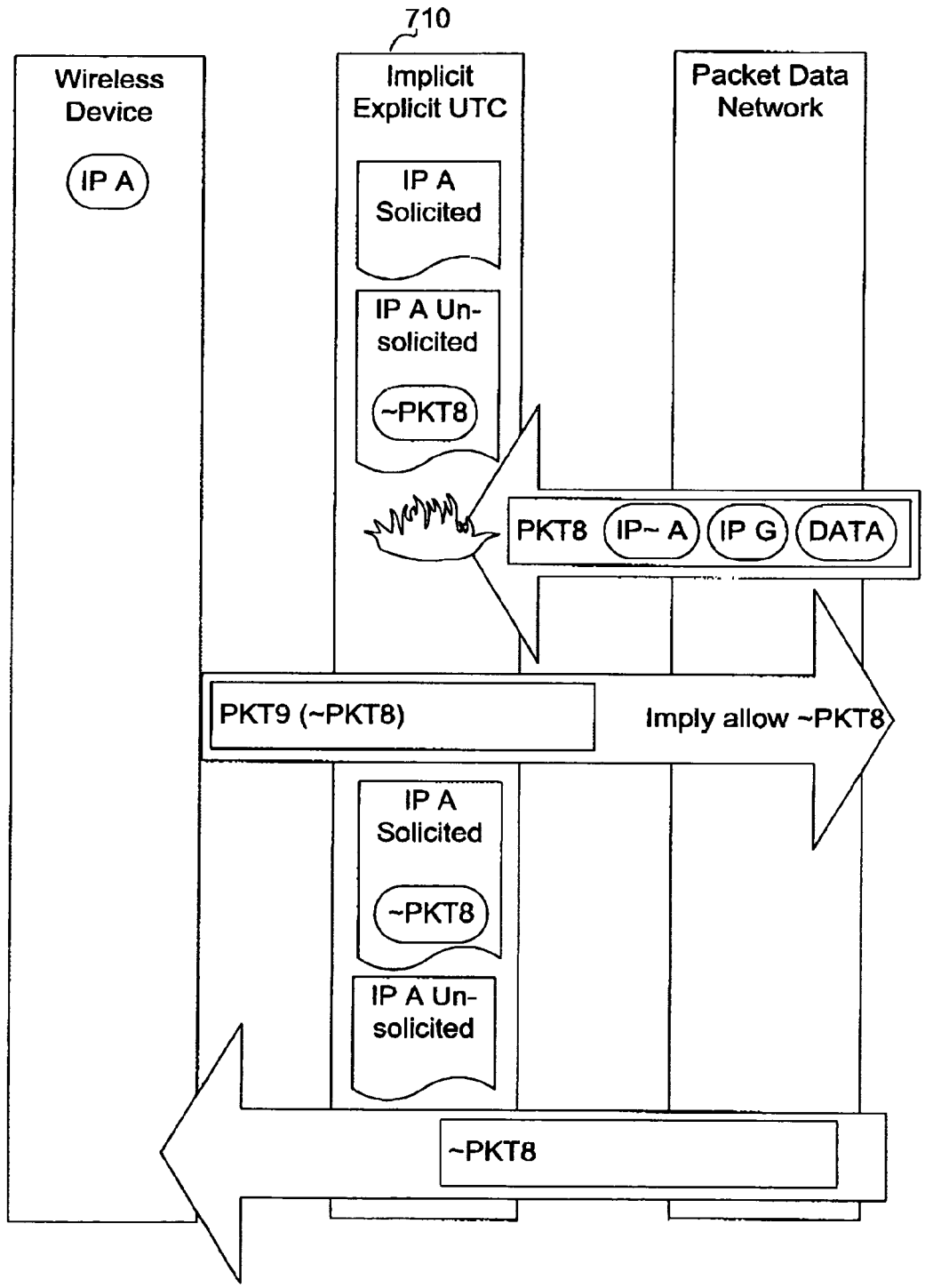
Figure 8:
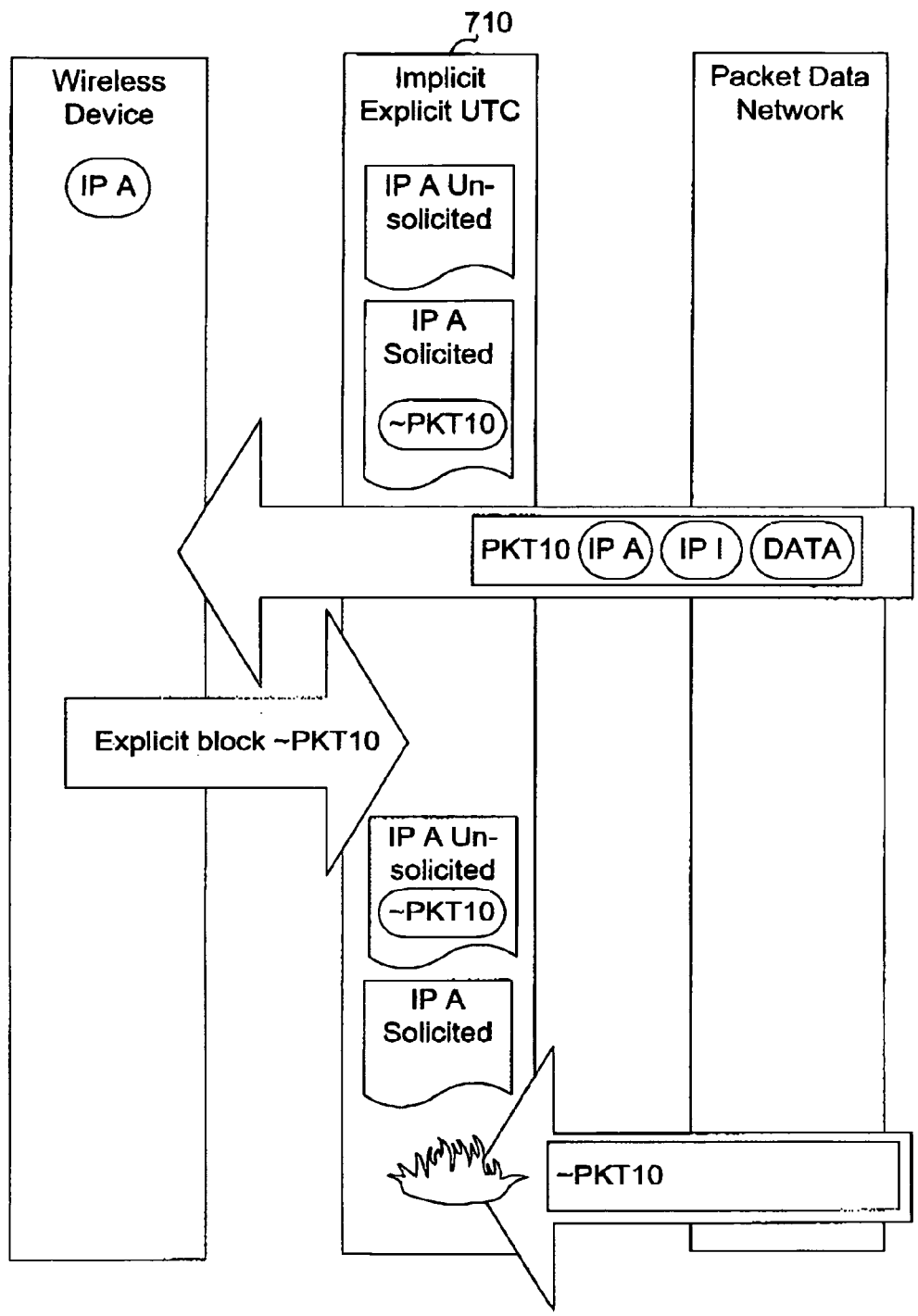

FIGS. 7-8 shows an embodiment of an UTC 710 that combines the implicit aspect of the UTC 210 of FIG. 2 with the explicit aspect of UTC 310 of FIG. 3.

The lists utilized to categorize the various nature of packets in relation to a particular wireless device have thus far been kept separate in order to enable the reader to better understand their operation. However, as FIGS. 2-8 demonstrate that introducing the appropriate lists into the UTC and following the appropriate procedures for updating those lists can combine various aspects of these UTCs, such as the implicit, explicit, and dynamic aspects. Therefore, for the remainder of this document and in the appended claims, the term rules will be used as a generic for the various lists utilized by a UTC to keep track of a wireless device, such as but not limited to the solicited, unsolicited, and unknown lists used thus far.

Figure 9:
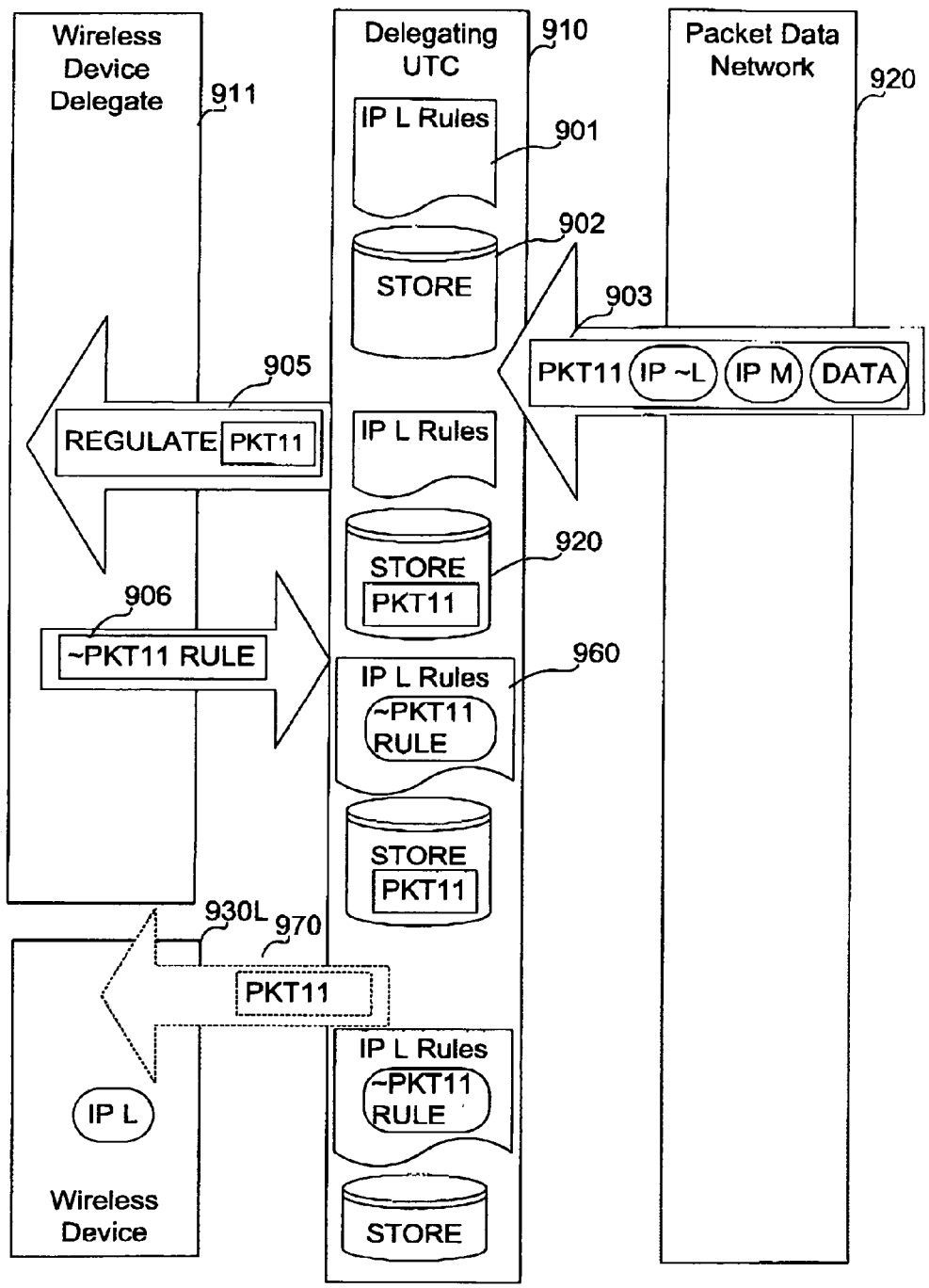
FIG. 9 is an interaction diagram illustrating the technique of delegating unsolicited traffic control, provided in accordance with the present application.

FIG. 9 is an interaction diagram illustrating the technique of delegating unsolicited traffic control, provided in accordance with the present application. Turning to FIG. 9. initially, a UTC 910 does not contain any IP L rules 901 for wireless communication device 930L, which as illustrated in FIG. 9 currently has address IP L. When PKT11 903 arrives, UTC 910 sends PKT11 in a regulation message 905 to wireless device delegate 911 and at substantially the same time stores a copy of the packet in storage 920, which was initially empty 903. After receiving PKT11, wireless device delegate 950 forms PKT11 rule 906 and sends it back to UTC 910 in response to the regulation message 905. UTC 910 updates the rules 960 for wireless communication device 930L accordingly. If the rule for PKT11 is such that PKT11 903 would be allowed to go through to wireless communication device 930L, UTC 910 forwards 970 a copy of stored PKT11 to wireless communication device 930L. Conversely if the rule for PKT11 is such that PKT11 903 is not allowed to go to wireless communication device 930L, then it is not forwarded. In the drawing, the conditional aspect of the forwarding 970 is illustrated by using a doted line to represent the message 970.

Figure 10:
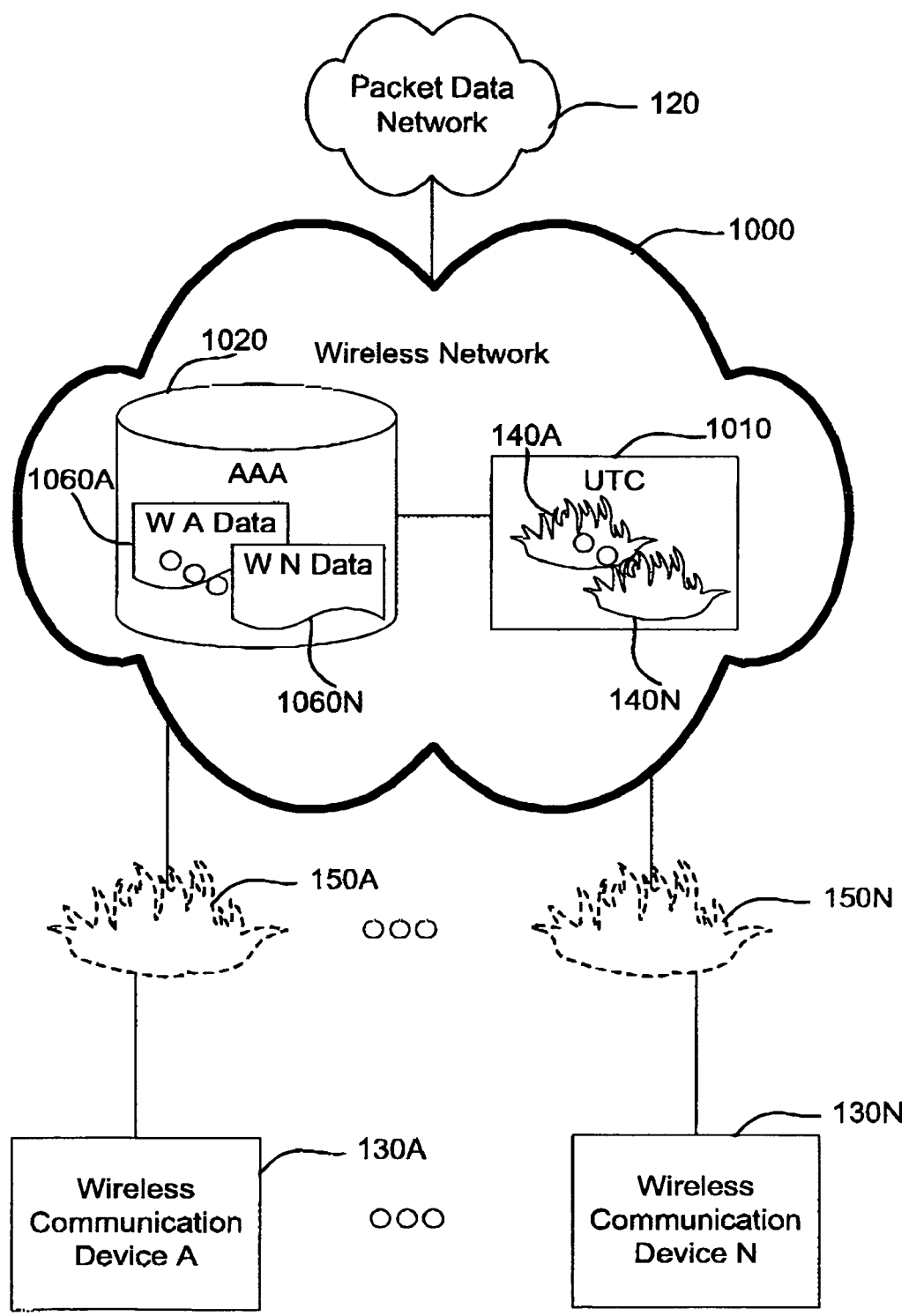
FIG. 10 is a block diagram illustrating a wireless network including an embodiment of a UTC, provided in accordance with the present application.

FIG. 10 is a block diagram illustrating a wireless network including an embodiment of an unsolicited traffic controller, provided in accordance with the present application. Compared with FIG. 1, FIG. 10 further details wireless network 1000 showing the cooperation between UTC 1010 and an Authentication, Authorization and Accounting server AAA 1020. AAA 1020 manages subscriber information wireless devices 130A-130N as illustrated by records W A Data 1060A through W N Data 1060N. An example of AAA is a RADIUS server.

Figure 11:
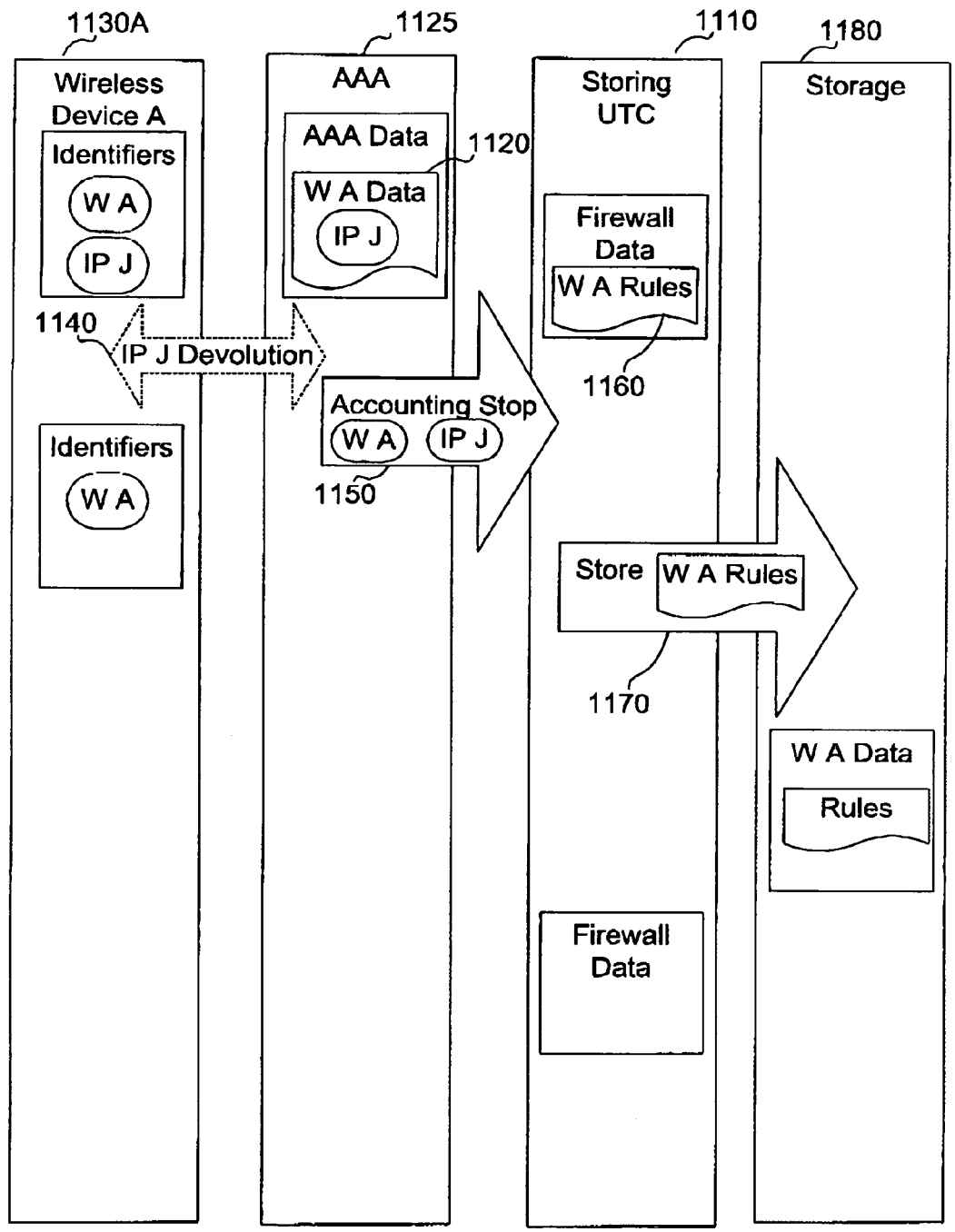
FIG. 11 is an interaction diagram illustrating the UTC behaviour when a wireless communication device ceases operation, provided in accordance with the present application.

FIG. 11 is an interaction diagram illustrating the UTC behaviour when a wireless communication device ceases operation, provided in accordance with the present application. Turning now to FIG. 11. A wireless communication device A 1130A with identifier WA is assigned address J. A device profile 1120 is created in AAA 1125. When the address J assigned to the wireless communication device A is devolved 1140, AAA sends a message that substantially indicates that device A data is inactive, such as Accounting Stop message 1150 to storing UTC 1110. UTC 1110 identifies the UTC rules 1160 associated with wireless communication device 1130A according to the identifier WA and address J assigned to that wireless communication device. UTC 1110 then stores 1170 the firewall rules associated with wireless communication device 1130A to a storage device 1180 for later retrieval.

Figure 12:
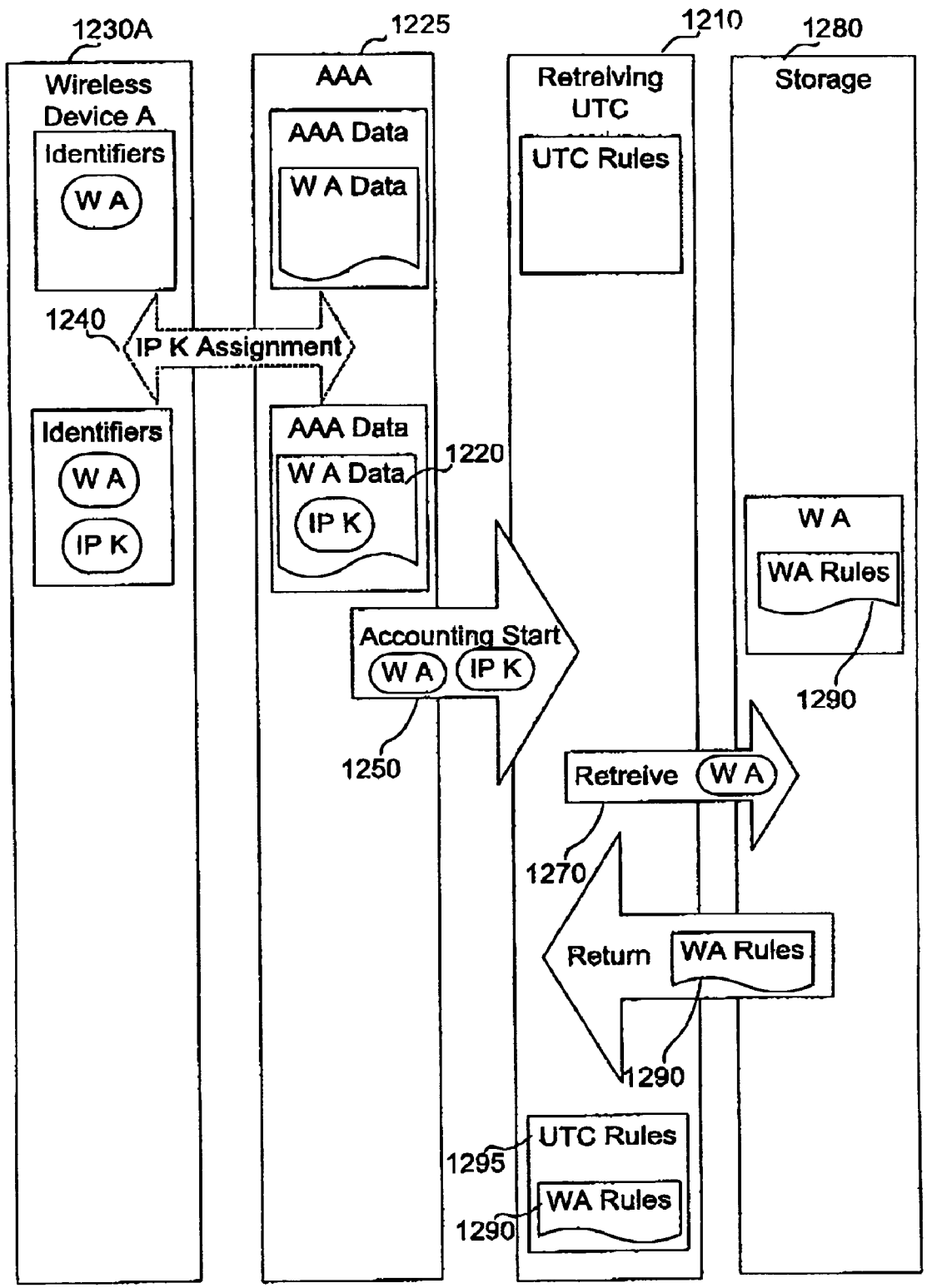
FIG. 12 is an interaction diagram illustrating the UTC behaviour when a previously active wireless communication device is becomes active again, provided in accordance with the present application.

FIG. 12 is an interaction diagram illustrating the UTC behaviour when a previously inactive wireless communication device becomes active again, provided in accordance with the present application. Turning to FIG. 12. initially the wireless communication device 1230A with identifier WA has no address, and then is assigned 1240 address K. AAA 1225 sends a message that substantially indicates that device A data is active, such as Accounting Start message 1250, to retrieving UTC 1210. UTC 1210 retrieves 1270 the stored UTC rules 1290 for device A from the storage 1280 and updates UTC data 1295 with rules 1290 to apply to address K and starts functioning on behalf of wireless communication device 1230A with address K.

Figure 13:
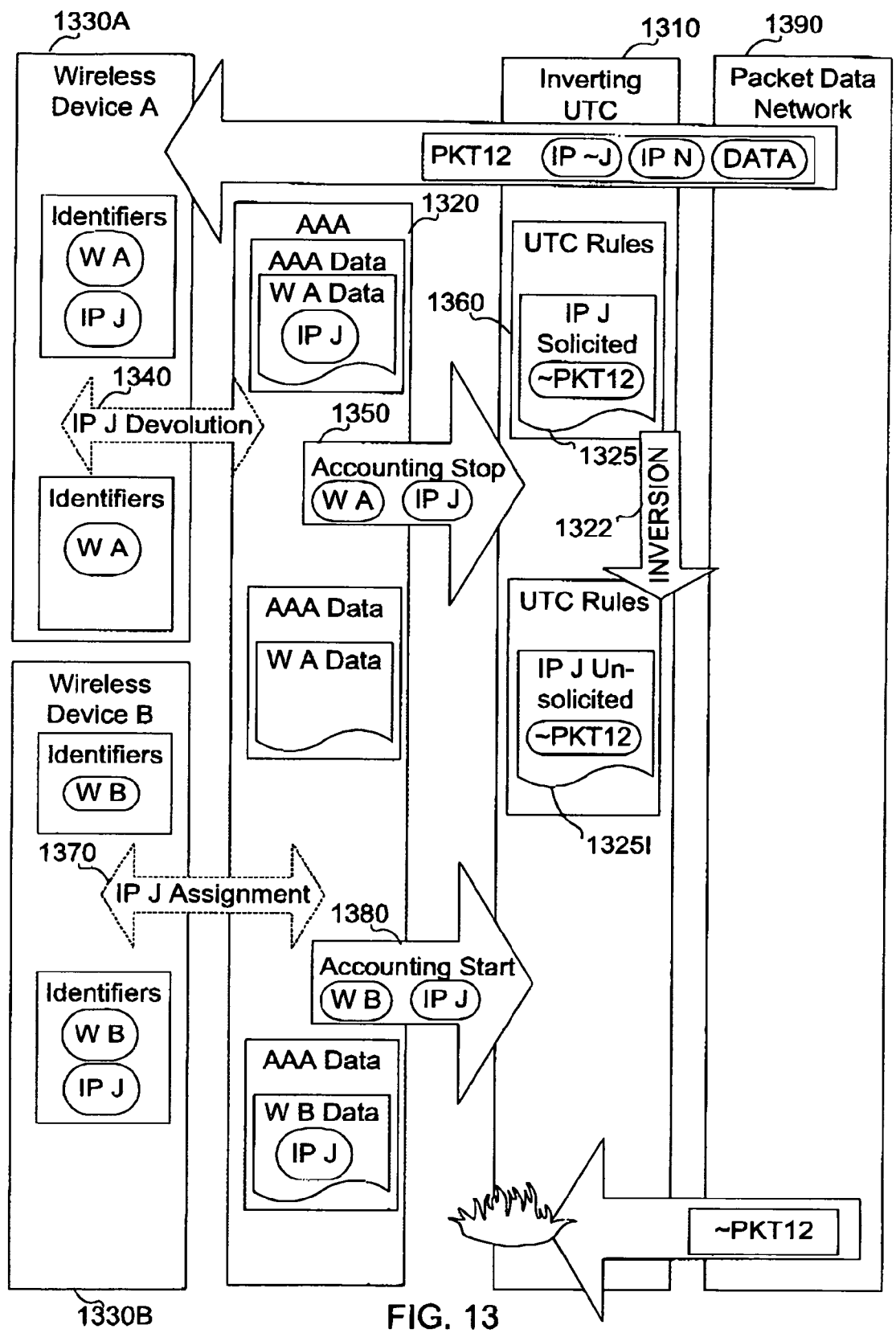
FIG. 13 is an interaction diagram illustrating the interaction when an address assigned to a wireless communication device is devolved and re-assigned to another wireless communication device, provided in accordance with the present application.

FIG. 13 is an interaction diagram illustrating the technique of UTC rule inversion when an address assigned to a wireless communication device is re-assigned to another wireless communication device, provided in accordance with the present application. Turning to FIG. 13. a wireless communication device A 1330A with identifier WA initially is assigned address J. UTC 1310 holds the UTC rules 1360 on behalf of wireless communication device A 1330A. As shown in the drawing, according to the rules currently in effect for WA, PKT12 is allowed to go through and reach wireless communication device A 1330A. However, at a later time wireless communication device A 1330A devolves address J back to the AAA 1320. Upon devolution of IP J 1340, AAA 1320 sends a message that substantially indicates that device A data is inactive such as Accounting Stop 1350, to UTC 1310. UTC 1310 inverts the IP J solicited rules 1325 portion of the UTC rules 1360. Since this portion of the rules was related to wireless communication device A 1330A, the inversion 1322 ensures that when wireless communication device 1330B becomes active, and is assigned 1370 IP address J, even before AAA 1320 sends a message substantially indicating that wireless device B data is active, such as Accounting Start message 1380 to UTC 1310, UTC 1310 advantageously blocks all packets which were considered solicited by wireless device A 1330A. The inverted rules 13251 thus ensure that, if wireless device A was using VPN through packet data network 1390 for example, and did not terminate VPN before devolution of IP J 1340, no unsolicited packets, such as ~PKT12, left over from the stale VPN session will ever reach wireless device B 1330B. Preferably, the inversion is temporary, for example clearing inverted rules 13251 after all stale sessions would be known to have timed out, or replacing maintaining inverted rules 13251 until UTC 1310 substitutes the inverted rules 13251 with rules on behalf of wireless device B 1330B, or until a predetermined timeout period has expired.

Figure 14:
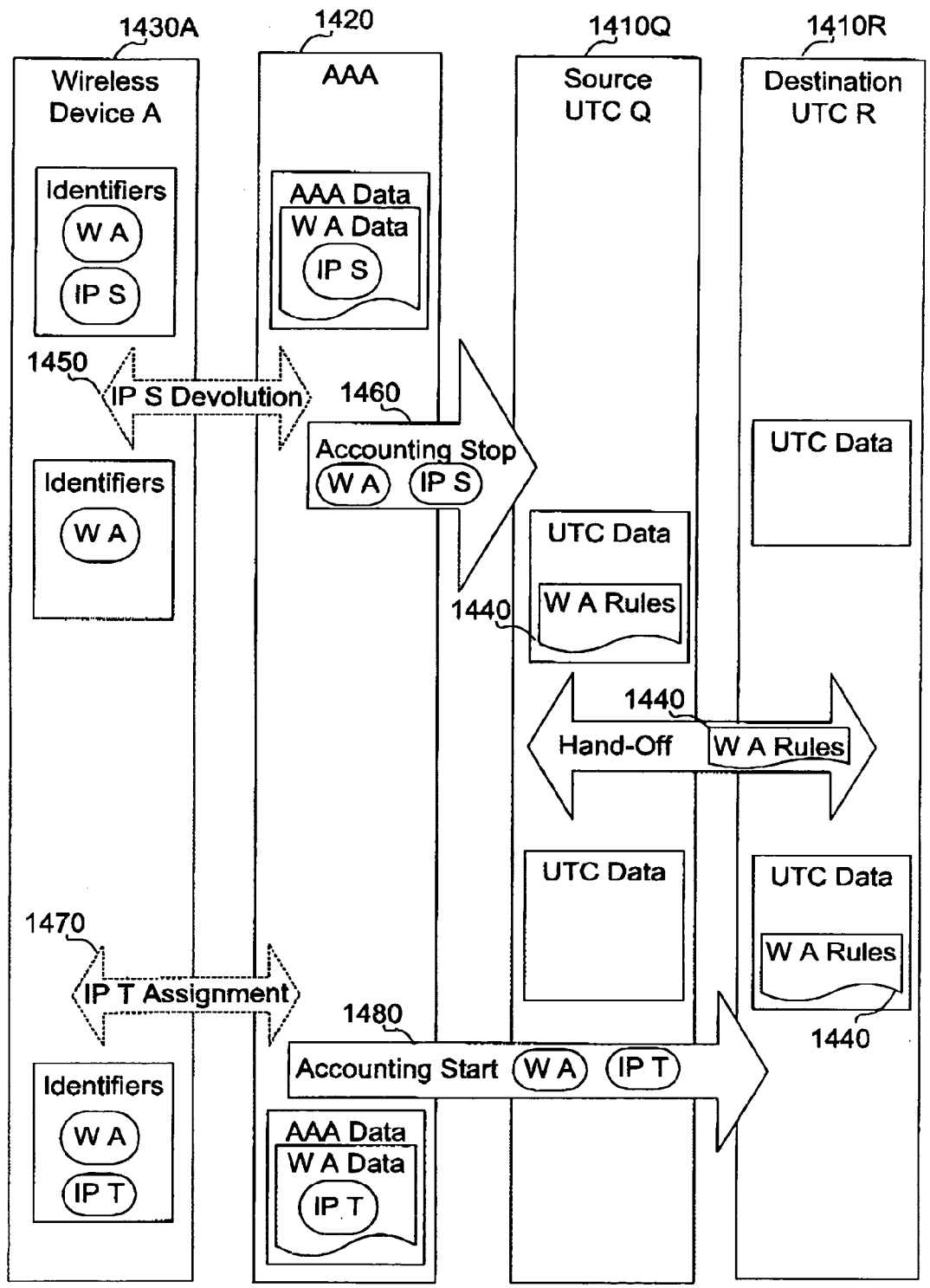
FIG. 14 is an interaction diagram illustrating the interaction when a wireless communication does an inter-UTC handoff, provided in accordance with the present application.

FIG. 14 is an interaction diagram illustrating the technique of inter-UTC hand-off, provided in accordance with the present application. Turning to FIG. 14 a wireless communication device A 1430 with identifier WA is using address S assigned by AAA 1420. AAA 1420 sends a message that substantially indicates that device A data is inactive, such as Accounting Stop 1460, to source UTC 1410Q. IP S devolution 1450, could be as a result of mobility, for example. A hand-off of WA Rules 1440 from UTC Q 1410Q to UTC R 1410R occurs.

Initially source UTC Q 1410Q holds the WA Rules 1440 on behalf of wireless communication device A 1430. After the hand-off, WA Rules 1440 are held at destination UTC R 1410R. When AAA 1420 assigns IP T 1470 to wireless device 1430A, AAA 1420 sends a message that substantially indicates that device A data is active, such as Accounting Start 1480, to UTC R 1410R. Advantageously, UTC R 1410R already has WA Rules 1440 as a result of the hand-off, so wireless device WA 1430A is never left unprotected by its WA Rules 1440.

Although not expressly shown in the drawing, other mechanisms than the devolution and re-assignment of addresses may cause the hand off. For example AAA 1420 may issue hand off direction orders to UTCs.

Figure 15:
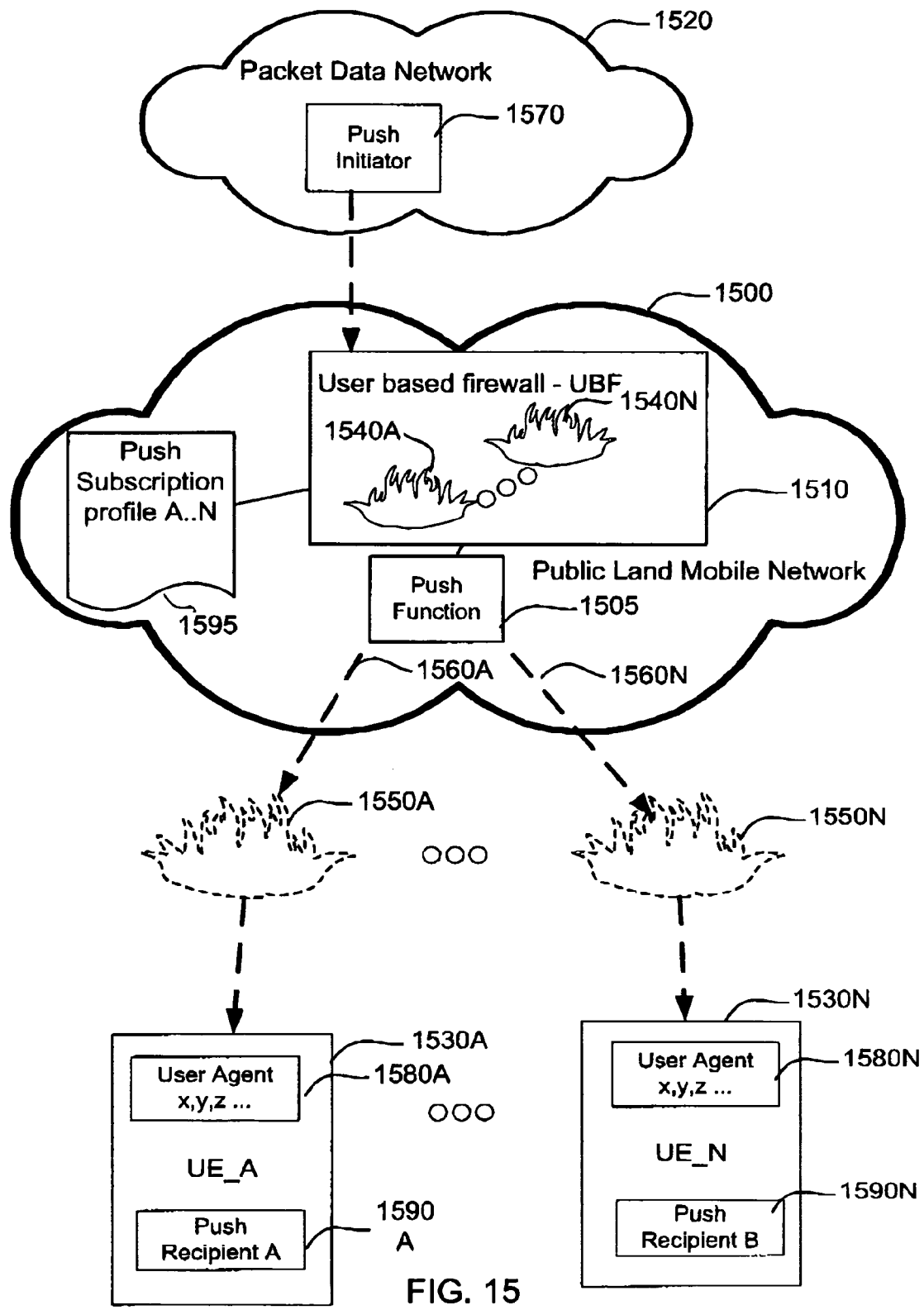
FIG. 15 is a block diagram illustrating a wireless network including an embodiment of a UTC adapted to a $3^{rd}$ Generation Partnership Project (3GPP) General Packet Radio Service (GPRS) environment, provided in accordance with the present application.

FIG. 15 shows the GPRS embodiment described in the above paragraph in greater detail. Turning now to FIG. 15 and referring both to FIG. 1 and FIG. 15, the Public Land Mobile Network (PLMN) 1500 (a wireless network 100) is the 3GPP network that receives the push data from the push initiator 1570 (which is in the packet data network 120 or 1520) and ensures the delivery of push data to the push recipient (which is in at least one of wireless communication devices 130A-130N or user equipments (UE) 1530A-1530N. The delivery of the push data may involve other networks not explicitly shown in FIG. 1 or FIG. 15. The push function 1505 is the function in the PLMN 1500 that receives the push data from the push initiator 1570. The push function is responsible for delivering the push data to the push recipient 1590A-1590N. The packet data network 1520 is an interface into the PLMN 1500 via IP. User Equipment 1530A-1530N is any one of the wireless communication devices 130A-130N. Operationally, User Based Firewall (UBF) rules or Subscription-Based Firewall (SBF) rules (such as 140A-140N or 1540A-1540N) are persistently stored firewall rules based on the user or subscription rather than the session, and enforced by unsolicited traffic controller 1510 or 110. For example, a subscription-based rule will persist for a particular user or subscription across many IP (or other) sessions, whereas an IP based rule will persist for the duration of the IP session. A subscription may include more than one user, such as for example all users in a corporation. The user (or subscription) based firewall rules may be explicitly defined by the user, the operator, or implicitly defined by UE behaviour (for example, solicitation of a service). UE based list of firewall rules operate so as to appear substantially as if each interface had an apparent firewall 1550A-1550N (150A-150N) protecting each user equipment's bearer path 1560A-1560N linking wireless network 1500 or 100 with wireless communication devices 1530A-1530N (130A-130N). It is envisaged that the bearer path may include either or all of: sms, sip, circuit switched, packet switched, trunk service, wlan, broadcast, multicast or any other bearer required to provide a communication service such as voice, push to talk, wap, email, html, chat and the like. The push initiator 1570 is the entity that originates push data and submits it to the push function 1505 for delivery to a push recipient 1590A-1590N. A push initiator may be for example an application providing value added services, such as email or other timely communications. A push user agent 1580A-1580N is any software or device associated with a push recipient that interprets push data to the user of wireless communication devices 130A-130N. This may include textual browsers, voice browsers, search engines, machine or device interface software, and other push user agents, for example. A push recipient is the entity that receives the push data from the Push function and processes or uses it. This is the UE with which the PLMN communicates with and bills to, the user agent with the application level address, and the device, machine or person that uses the push data. An individual user or subscription controls a push recipient. A push subscription profile (PSP) 1595 for each user or subscriber is preferably accessible to the user based firewall (UBF) integral to unsolicited traffic controller 1510 or 110. The PSP is a set of parameters indicating the push recipient's settings and preferences for the push service. This may include an override capability for the wireless carrier to implement a standard set of UBF rules for all Push Recipients (subscribers). For example, this would allow for all users to get WAP push by default without the capability to block it. A similar example is for Broadcast/multicast service.

Figure 16:
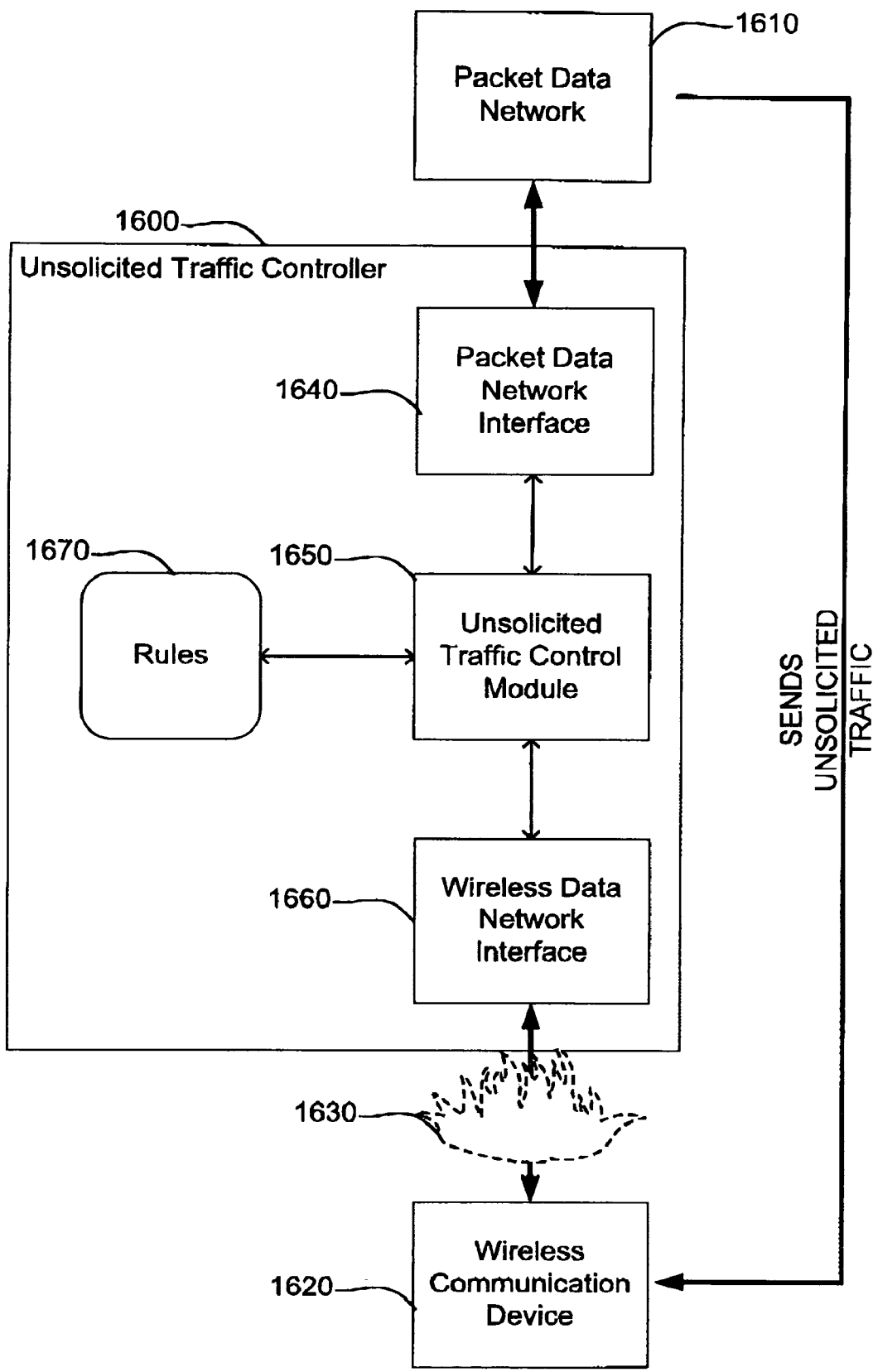
FIG. 16 is a block diagram illustrating an exemplary embodiment of an unsolicited traffic controller apparatus provided in accordance with the present application.

FIG. 16 shows an exemplary embodiment of an unsolicited traffic controller apparatus, provided in accordance with the present application. Packet data network 1610 sends unsolicited traffic destined to wireless communication device. Unsolicited traffic controller 1600 intercepts all traffic sent by packet data network 1610 that is destined for wireless communication device 1620, or other like devices for whom it is delegated authority to control unsolicited traffic. Unsolicited traffic controller 1600 includes a packet data network interface 1640 to receive packets from packet data network, as well as a wireless data network interface 1660 to send packets to the wireless communication device 1620.

Operationally, unsolicited traffic control module 1650 applies rules 1670 on behalf of wireless communication device 1620 to selectively block packets from being sent over wireless data network interface 1660 to wireless communication device 1620 thereby providing an apparent firewall 1630 that substantially prevents packets which are considered unsolicited by wireless communication device 1620 from ever reaching the wireless communication device 1620.

In alternate embodiments, the interfaces 1640 and 1660 may be one way so that they can only receive and transmit respectively, or can be two-way allowing packets to be both transmitted and received.

The embodiments described herein are examples of structures, systems or methods having elements corresponding to elements of this application. This written description may enable those skilled in the art to make and use embodiments having alternative elements that likewise correspond to the elements of this a. The intended scope of the application thus includes other structures, systems or methods that do not differ from the invention as described herein, and further includes other structures, systems or methods with insubstantial differences from the invention as described herein.

We claim:

1. In a wireless communication network, said wireless communication network comprising an unsolicited traffic controller (UTC) coupled to a packet data network and a plurality of wireless communication devices, a method of controlling traffic destined to a first wireless communication device of said plurality of wireless communication devices, the method comprising the steps of:

storing a set of traffic control rules associated with said first wireless communication device;

determining a first identity corresponding to a user of said first wireless communication device;

in response to one of: an incoming packet flowing from said packet data network and destined for said first wireless communication device; and an outgoing packet flowing from said first wireless communication device and destined for said packet data network, selecting said stored traffic control rules associated with said determined first identity and updating automatically said selected traffic control rules;

determining that a subsequent packet received from said packet data network is destined to said first wireless communication device;

applying said selected traffic control rules to determine if said subsequent packet is unsolicited by said user; and preventing said subsequent packet from being sent to said first wireless communication device if said subsequent packet is determined to be unsolicited.

2. The method as recited in claim 1, wherein said wireless communication network is a CDMA wireless network and wherein said UTC is located in at least one PDSN.

3. The method as recited in claim 1, wherein said wireless communication network is a GPRS wireless network and wherein said UTC is located in one of a SGSN and GGSN.

4. The method as recited in claim 1, wherein said set of traffic control rules is implicit, explicit, dynamic or a combination thereof.

5. The method as recited in claim 1, wherein said selected traffic control rules comprise implicit traffic control rules, wherein in response to said outgoing packet flowing from said first wireless communication device and destined for said packet data network, updating automatically said selected traffic control rules comprises updating a list of solicited traffic in said implicit traffic control rules with a definition of traffic substantially similar to said outgoing packet, and wherein the method further comprises:

applying said selected traffic control rules to determine if said subsequent packet is solicited by said user by determining with use of said definition if said subsequent packet is substantially similar to said outgoing packet; and releasing said subsequent packet to said first wireless communication device if said subsequent packet is determined to be solicited.

6. The method as recited in claim 1, wherein said selected traffic control rules comprise explicit traffic control rules, wherein in response to said incoming packet flowing from said packet data network and destined for said first wireless communication device, updating automatically said selected traffic control rules comprises:

releasing said incoming packet to said first wireless communication device;

sending from said first wireless communication device to said UTC a message regarding said incoming packet; and with use of said message updating a list of unsolicited traffic in said explicit traffic control rules with a definition of traffic substantially similar to said incoming packet, wherein applying said selected traffic control rules to determine if said subsequent packet is unsolicited by said user comprises determining with use of said definition if said subsequent packet is substantially similar to said incoming packet.

7. The method as recited in claim 1, wherein said selected traffic control rules comprise dynamic traffic control rules, wherein in response to said incoming packet flowing from said packet data network and destined for said first wireless communication device, updating automatically said selected traffic control rules comprises:

releasing said incoming packet to said first wireless communication device; and updating a list of unknown traffic in said dynamic traffic control rules with a definition of traffic substantially similar to said incoming packet, wherein applying said selected traffic control rules to determine if said subsequent packet is unsolicited by said user comprises determining with use of said definition if said subsequent packet is substantially similar to said incoming packet.

8. The method as recited in claim 1, wherein said first identity is selected from a group consisting of: IMSI, NAI, MSIDSN, and SIP url.

9. The method as recited in claim 1, wherein said incoming packet and said outgoing packet are selected from a group comprising Internet Protocol, voice, email, hyper text transfer protocol, file transfer protocol, multimedia messaging service, and short messaging service.

10. The method as recited in claim 1, wherein said UTC is a delegating UTC and wherein in response to said incoming packet flowing from said packet data network and destined for said first wireless communication device, updating automatically said selected traffic control rules comprises:

sending said incoming packet in a regulation message to a delegate to regulate said incoming packet on behalf of said first wireless communication device;

storing said incoming packet in said delegating UTC;

receiving in said delegating UTC a rule from said delegate; and updating said selected traffic control rules with said received rule.

11. The method as recited in claim 1, wherein said wireless communication network further comprises an authentication, authorization and accounting (AAA) server communicating with said UTC, and wherein said method further comprises the steps of:

creating a profile associated with said first wireless communication device in said AAA;

devolving said first identity and sending an accounting stop message from said AAA to said UTC when said first wireless communication device becomes inactive;

identifying said stored set of traffic control rules associated with said first wireless communication device; and storing said identified set of traffic control rules in a storage device for later retrieval.

12. The method as recited in claim 11 further comprising the steps of:

assigning a second identity corresponding to said user of said first wireless communication device;

sending an accounting start message from said AAA to said UTC when said first wireless communication device becomes active;

retrieving said stored set of traffic control rules from said storage device; and associating said retrieved rules with said second identity.

13. The method as recited in claim 11 further comprising the steps of:
assigning said devolved first identity to a second wireless communication device of said plurality of wireless communication devices;
inverting said identified set of traffic control rules associated with said first identity;
sending an accounting start message from said AAA to said UTC when said second wireless communication device becomes active; and
applying said inverted set of traffic control rules to said second wireless communication device.

14. The method as recited in claim 11, wherein said UTC is a source UTC, and wherein said method further comprises the steps of:
devolving said first identity and sending an accounting stop message from said AAA to said source UTC indicating that said first wireless communication device has become inactive;
transferring said identified set of traffic control rules to a destination UTC;
assigning a second identity corresponding to said user of said first wireless communication device;
sending an accounting start message from said AAA to said destination UTC indicating that said first wireless communication device has become active; and
applying said transferred set of traffic control rules to said first wireless communication device.

15. A computer readable medium having stored thereon, computer executable instructions which when executed by a processor in an unsolicited traffic controller (UTC), cause said UTC to:
store a set of traffic control rules associated with a specified wireless communication device of a plurality of wireless communication devices;
determine an identity corresponding to a user of said specified wireless communication device;
in response to one of: an incoming packet flowing from a packet data network and destined for said specified wireless communication device; and an outgoing packet flowing from said specified wireless communication device and destined for said packet data network, select said stored traffic control rules associated with said determined identity and update automatically said selected traffic control rules;
determine that a subsequent packet received from a packet data network is destined to said specified wireless communication device;
apply said selected traffic control rules to determine if said subsequent packet is unsolicited by said user; and
prevent said subsequent packet from being sent to said specified wireless communication device if said subsequent packet is determined to be unsolicited,
wherein said UTC is resident in a wireless communication network and coupled to said packet data network and said plurality of wireless communication devices.

16. In a wireless communication network, said wireless communication network comprising an unsolicited traffic controller (UTC) coupled to a packet data network and a plurality of wireless communication devices, a method of controlling traffic destined to a specified wireless communication device of said plurality of wireless communication devices, the method comprising:
storing a set of traffic control rules associated with said specified wireless communication device;
determining an identity corresponding to a user of said specified wireless communication device;
in response to one of: an incoming packet flowing from a packet data network and destined for said specified wireless communication device; and an outgoing packet flowing from said specified wireless communication device and destined for said packet data network, selecting said stored traffic control rules associated with said determined identity and updating automatically said selected traffic control rules;
determining in said UTC that a subsequent packet received from said packet data network is destined to said specified wireless communication device;
applying said stored traffic control rules to determine if said subsequent packet is unsolicited by said user; and
preventing said first packet from being sent to said specified wireless communication device if said subsequent packet is determined to be unsolicited.

17. In a wireless communication network, said wireless communication network comprising an unsolicited traffic controller (UTC) coupled to a push initiator and a plurality of push recipients, a method of controlling push data transferred to a push function for delivery to said plurality of push recipients comprising the steps of:
storing subscription based firewall (SBF) rules associated with a specified group of push recipients of said plurality of push recipients, wherein said SBF rules are persistently stored rules based on a subscription;
in response to one of: push data received from said push initiator and destined for said specified group of push recipients; and data from said specified group of push recipients and destined for said push initiator, selecting said SBF rules and updating automatically said SBF rules;
determining that subsequent push data received from said push initiator is destined for said specified group of push recipients;
applying said selected SBF rules to determine if said subsequent push data is unsolicited by said specified group of push recipients;
preventing said subsequent push data from being sent to said specified group of push recipients, if said subsequent push data is determined to be unsolicited.

18. The method of claim 17 wherein said push initiator is a packet data network.

19. The method of claim 18 wherein said plurality of push recipients are respective wireless communication devices.

20. The method of claim 19 wherein the wireless communication network is a public land mobile network.

21. The method of claim 19 wherein each of said plurality of push recipients comprise a push user agent taken from the group comprising a text browser, a voice browser and a search engine.

22. The method of claim 19 wherein each of said plurality of push recipients is controlled by a push subscription profile (PSP) accessible by said UTC, and wherein said PSP defines a specified type of push data that can be received from said push initiator.

23. The method of claim 17 wherein said UTC is linked to said push recipient along a bearer path, and wherein said bearer path is taken from the group comprising an sms, sip, circuit switched, packet switched, trunk service, wlan, broadcast and multicast path.

24. In a wireless communication network, an apparatus for controlling unsolicited traffic destined to a specified wireless communication device of a plurality of wireless communication devices, the apparatus comprising:
a first interface configured to receive traffic from a packet data network;

a second interface configured to send traffic to said specified wireless communication device;
a first storage medium having stored thereon computer executable instructions representing a set of traffic control rules; and
an unsolicited traffic controller (UTC) communicating with said first and second interfaces and said first storage medium, wherein said UTC:
determines an identity assigned to said specified wireless communication device;
in response to one of: an incoming packet flowing from a packet data network and destined for said specified wireless communication device; and an outgoing packet flowing from said specified wireless communication device and destined for said packet data network, selects, of said set of traffic control rules, traffic control rules associated with said determined identity and updates automatically said selected traffic control rules;
determines that a subsequent packet received over said first interface from said packet data network is destined to said specified wireless communication device; and
executes said computer executable instructions to apply said selected traffic control rules to determine if said subsequent packet is unsolicited traffic and to selectively block said unsolicited traffic received over said first interface from being sent over said second interface to said specified wireless communication device.

25. The apparatus as recited in claim 24, wherein said wireless communication network is a GPRS wireless network and said UTC is located in one of a SGSN and GGSN.

26. The apparatus as recited in claim 24, wherein said wireless communication network is a CDMA wireless network and wherein said UTC is located in at least one PDSN.

27. The apparatus as recited in claim 24, wherein said set of traffic control rules is implicit, explicit, dynamic or a combination thereof.

28. The apparatus as recited in claim 24, wherein said identity is selected from a group consisting of: IMSI, NAI, MSIDSN, and SIP url.

29. The apparatus as recited in claim 24, wherein said traffic is selected from a group comprising Internet Protocol, voice, email, hyper text transfer protocol, file transfer protocol, multimedia messaging service, and short messaging service.

30. The apparatus as recited in claim 24 further comprising a delegate communicating with said UTC for regulating said subsequent packet on behalf of said specified wireless communication device.

31. The apparatus of claim 24 further comprising an authentication, authorization and accounting (AAA) server communicating with said UTC for managing subscriber information associated with respective ones of said plurality of wireless communication devices.

32. The apparatus as recited in claim 31, further comprising a second storage medium communicating with said UTC for storing said set of traffic control rules when said specified wireless communication device becomes inactive.

33. In a wireless communication network, an apparatus for controlling unsolicited traffic destined to a specified wireless communication device of a plurality of wireless communication devices, the apparatus comprising:
an unsolicited traffic controller (UTC) comprising a subscription based firewall (SBF) having subscription based firewall rules associated therewith;
a push initiator comprising a packet data network communicating with said UTC; and
a push recipient comprising at least one wireless communication device communicating with said UTC,
wherein in response to one of: push data received from said push initiator and destined for said push recipient; and outgoing data from said push recipient and destined for said push initiator, said UTC selects said SBF rules, and automatically updates said SBF rules, wherein subsequent push data received by said UTC from said push initiator has applied thereto said SBF rules to determine if said push data is unsolicited.

34. In a wireless communication network, an apparatus for controlling unsolicited traffic destined to a specified wireless communication device of a plurality of wireless communication devices, the apparatus comprising:
means for receiving traffic from a packet data network;
means for sending traffic to said specified wireless communication device;
means for storing computer executable instructions representing a set of traffic control rules;
means for determining an identity assigned to said specified wireless communication device;
means for, in response to one of: an incoming packet flowing from a packet data network and destined for said specified wireless communication device; and an outgoing packet flowing from said specified wireless communication device and destined for said packet data network, selecting, of said set of traffic control rules, traffic control rules associated with said determined identity and automatically updating said selected traffic control rules;
means for determining that a subsequent packet received from said packet data network is destined to said specified wireless communication device; and
means for executing said computer executable instructions to apply said selected traffic control rules to determine if said subsequent packet is unsolicited traffic; and to selectively block traffic received from said packet data network and destined for said specified one of said plurality wireless communication devices, wherein said means for executing communicates with said means for receiving, said means for sending and said means for storing.

* * * * *

UNITED STATES PATENT AND TRADEMARK OFFICE
CERTIFICATE OF CORRECTION

PATENT NO.       : 7,545,767 B2                                      Page 1 of 1
APPLICATION NO.  : 10/996664
DATED            : June 9, 2009
INVENTOR(S)      : Wen Zhao et al.

It is certified that error appears in the above-identified patent and that said Letters Patent is hereby corrected as shown below:

On the front page, item (75) Inventors, second inventor last name, delete "Plestio" and insert therefor "Plestid"

Signed and Sealed this
Sixth Day of September, 2011

David J. Kappos
*Director of the United States Patent and Trademark Office*